May 13, 1958     K. J. THELEN     2,834,398
CONCEALABLE SEAT ATTACHMENT FOR VEHICLES
Filed May 13, 1955

INVENTOR.
*Kenneth J. Thelen*
BY
*David Manly Heller*
ATTORNEY

United States Patent Office 2,834,398
Patented May 13, 1958

2,834,398

CONCEALABLE SEAT ATTACHMENT FOR VEHICLES

Kenneth J. Thelen, Macomb, Ill.

Application May 13, 1955, Serial No. 508,122

8 Claims. (Cl. 155—80)

My invention relates to concealable seat and/or table attachments for vehicles and the like.

An important object of my invention is to provide an attachment of the aforementioned character which may be secured and foldably and compactly concealed within the trunk compartment of a vehicle or automobile.

Another object of my invention is to provide an attachment of the aforementioned character which is articulately secured to the spare tire anchorage means within the confines of the luggage compartment of a vehicle and which is provided with telescopic adjustable means so as to render it adaptable for various types and makes of automobiles.

A still further object of my invention is to have in an attachment of the aforementioned character rotatable seat means and rotatable equalizing back means so that the seat and back may be rotated to the most convenient position for the person resting on the seat.

A still further object of my invention is to provide in an attachment of the aforementioned character removably attached table means provided with foot means to support the same rigidly in convenient position adjacent said seat means.

A still further object of my invention is to provide an attachment of the aforementioned character which may be instantaneously dismantled and stored in the luggage compartment of a vehicle and the like.

A still further object of my invention is to provide an attachment of the aforementioned character which is economical to manufacture in quantity production and which is readily concealable and just as readily placed in operative position; in other words a device which may be useful for golfers, campers, fishermen, etc. for changing their shoes, clothing and for the preparation of the gear employed in the sport in which they are to participate.

Other objects and advantages inherent in my invention will become apparent from an examination of the accompanying drawings bearing further elucidation in the ensuing description, wherein like symbols are used to designate like parts, and in which.

Figure 1:
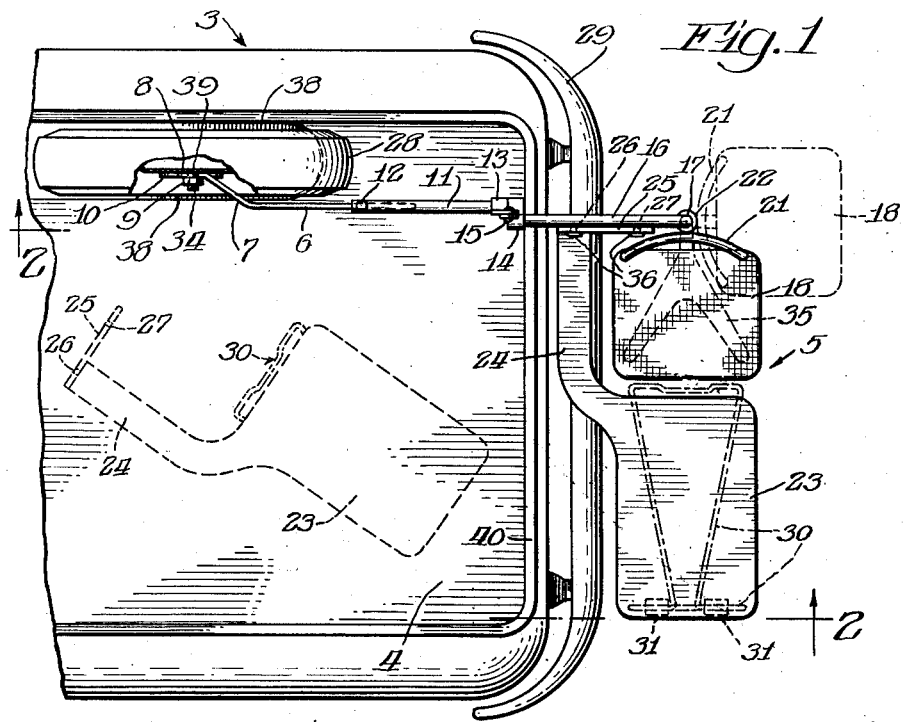
Fig. 1 is a top plan view of the luggage compartment of an automobile showing my invention attached thereto and set up in operative position.
Figure 2:
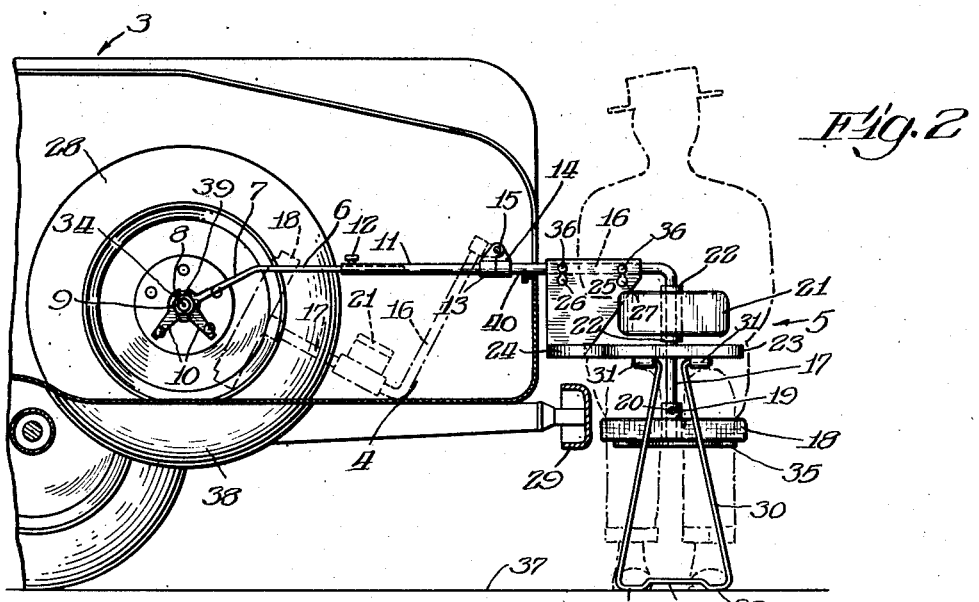
Fig. 2 is a front sectional view of Fig. 1 taken, substantially, on lines 2—2 of Fig. 1.

Referring to the various views my invention is generally designated 5 and it is shown mounted in relationship to the luggage compartment 4 of an automobile or vehicle generally designated 3, and provided with a conventional rear bumper 29.

Within the compartment 4 the conventional manner of mounting a spare tire 28 is indicated as being secured on the stud 34 by virtue of the nut element 9.

My invention consists of an arm 6 having a bent extension 7 which is swayed in order to form an enlarged attaching portion 8 suitably bored to fit over the stud 34 and having two supporting tentacles 10 in order to support a person seated on the seat element 18. The arm 6 is connected telescopically to a tube structure 11 and the telescopic adjustment is maintained by means of the lock screw 12. Inasmuch as the compartment 4 of different makes of automobiles may be of different dimensions this adjustment hence becomes therefore very vital.

The tube 11 is connected to the arm 16 by means of the hinged brackets 13 and 14 which are articulately connected at 15 in order to permit concealing the unit within the confines of the compartment 4 of the vehicle 3, as shown in dotted lines.

The arm 16 has a downwardly depending extension 17 in order to support the bearing bracket 19 of the seat element 18 which is suitably reinforced by a Y casting extension 35 emanating from the bracket 19.

The seat may be allowed to swivel as indicated by the dotted lines in Fig. 1 or it may be rigidly fixed in any desired position by means of the set screw 20. Should it be preferable to have the seat 18 swivel, a collar and set screw (not shown) may be secured to the extension 17 below the bearing 19. The arcuate backrest element 21 is rotatably mounted on the downwardly depending extension 17 and is confined in its horizontal plane of activity by means of the collars 22 secured by set screws not illustrated. The arm 16 is provided with a pair of headed rivets 36 exposing a portion of the bodies of the rivets equivalent in height to the thickness of the supporting bracket 25 which is provided with bayonet like slots 26 and 27 to permit instantaneous attachment or removal of the table 23. The attaching bracket 25 has an arm rest extension 24 which is connected to the table 23. The bottom portion of the table 23 is provided with a pair of bearings 31 in which is supported the tripod-like wire leg structure 30 having foot portions 33 and a relief portion 32 so that the same may be swung into operative position to rest on the ground surface 37 and provide ample support for the table in concert with the support of the bayonet-like slotted means 26 and 27. The table may be removed and placed in the compartment and the chair seat element may be folded into the compartment as shown in dotted lines by virtue of the articulation at the point 15. The leg element 30 may be swung into inoperative position against the bottom of the table 23 and thus the entire frame may be compactly disposed of when not in use.

The spare tire 28 rests in the tire well 38 of the luggage compartment 4 and is usually retained by a plate (not shown) fitted over the anchoring stud, said plate having a clearance bore for said stud and requiring removal of said plate as well as nut element 9. The attaching portion 8 is provided with a bifurcation 39 requiring but a loosening of the nut to remove the seat attachment 5 or the spare tire 28 may be removed by removal of nut 9 subsequent to the removal of attaching portion 8.

It is the province of the attaching portion 8 by virtue of its bifurcation 39 at the top portion thereof, to abut said anchoring stud firmly when a person is seated, the tentacles 10 tending to reinforce the same by distributing the load supported over a greater area.

When a person desires to change shoes for golf or fishing or rechange shoes after the sporting activity has been completed, the person is seated preferably with the seat 18 in the position shown in dotted lines, Fig. 1, or when the table 23 is to be utilized the seat element 18 is oriented to the full line position shown affording complete comfort by virtue of the arm rest extension 24. The attachment receives added support from the lip 40 of the luggage compartment 4.

I believe I have herein illustrated and described the nature of my invention, and expounded, in expository form, the teachings so that those familiar with the art will be able to practice my invention. Inasmuch as the same is susceptible of many modifications, alterations, and improvements, I hereby reserve the right to any improvements, alterations and modifications coming within the scope and spirit of my invention and disclosure, also the right to any improvements impliably embraced in the accompanying illustrations depicting the generally suggested elemental structure of my invention, and also any modifications, improvements, or alterations, falling within the purview of the foregoing description; my invention to be limited only by the subjoined claims.

Having thus described and revealed my invention, what I claim as new and desire to secure by Letters Patent is:

1. A concealable attachment for the luggage compartment of a vehicle or the like provided with spare tire anchorage means, comprising telescopic arm means adapted to be secured to said anchorage means, arm support means hingeably secured to said telescopic arm means and having a vertical support portion, and a seat element and a back rest element rotatably mounted on said vertical support portion of said arm support means, rivets means secured to said arm support means, and table means removably secured by virtue of bayonet slot lock means to said rivet means.

2. A concealable attachment for the luggage compartment of a vehicle or the like provided with spare tire anchorage means, comprising telescopic arm means adapted to be secured to said anchorage means, arm support means hingeably secured to said telescopic arm means and having a vertical support portion, and a seat element and a back rest element rotatably mounted on said vertical support portion of said arm support means, rivet means secured to said arm support means, and table means removably secured by virtue of bayonet slot lock means to said rivet means, said table means, including a table portion provided with an arm rest extension at one side thereof and terminating in a vertical table supporting bracket having said bayonet slot lock means.

3. A concealable attachment for the luggage compartment of a vehicle or the like provided with spare tire anchorage means, comprising telescopic arm means adapted to be secured to said anchorage means, arm support means hingeably secured to said telescopic arm means and having a vertical support portion, and a seat element and a back rest element rotatably mounted on said vertical support portion of said arm support means, rivet means secured to said arm support means, and table means removably secured by virtue of bayonet slot lock means to said rivet means, said table means provided with compactly foldable downwardly divergent leg means on an end portion thereof.

4. A concealable attachment for the luggage compartment of a vehicle or the like provided with spare tire anchorage means, comprising telescopic arm means adapted to be secured to said anchorage means, arm support means hingeably secured to said telescopic arm means and having a vertical support portion, and a seat element and a back rest element rotatably mounted on said vertical support portion of said arm support means, rivet means secured to said arm support means, and table means removably secured by virtue of bayonet slot lock means to said rivet means, said table means, including a table portion provided with an arm rest extension at one side thereof and terminating in a table supporting bracket having said bayonet slot lock means, said table means provided with compactly foldable downwardly divergent leg means on an end portion thereof.

5. A concealable attachment for the luggage compartment of a vehicle or the like provided with spare tire anchorage means, comprising telescopic arm means adapted to be secured to said anchorage means, arm support means hingeably secured to said telescopic arm means and having a vertical support portion, and a seat element and a back rest element both independently and rotatably mounted on said vertical support portion of said arm support means, rivet means secured to said arm support means, and table means removably secured by virtue of bayonet slot lock means to said rivet means, said back rest element being adapted to equalizably adjust itself to the torso of a person seated on said seat element.

6. A concealable attachment for the luggage compartment of a vehicle or the like provided with spare tire anchorage means, comprising telescopic arm means adapted to be secured to said anchorage means, arm support means hingeably secured to said telescopic arm means and having a vertical support portion, and a seat element and a back rest element both independently and rotatably mounted on said vertical support portion of said arm support means, rivet means secured to said arm support means, and table means removably secured by virtue of bayonet slot lock means to said rivet means, said table means, including a table portion provided with an arm rest extension at one side thereof and terminating in a vertical table supporting bracket having said bayonet slot lock means, said back rest element being adapted to equalizably adjust itself to the torso of a person seated on said seat element.

7. A concealable attachment for the luggage compartment of a vehicle or the like provided with spare tire anchorage means, comprising telescopic arm means adapted to be secured to said anchorage means, arm support means hingeably secured to said telescopic arm means and having a vertical support portion, and a seat element and a back rest element both independently and rotatably mounted on said vertical support portion of said arm support means, rivet means secured to said arm support means, and table means removably secured by virtue of bayonet slot lock means to said rivet means, said table means provided with compactly foldable downwardly divergent leg means on an end portion thereof, said back rest element being adapted to equalizably adjust itself to the torso of a person seated on said seat element.

8. A concealable attachment for the luggage compartment of a vehicle or the like provided with spare tire anchorage means, comprising telescopic arm means adapted to be secured to said anchorage means, arm support means hingeably secured to said telescopic arm means and having a vertical support portion, and a seat element and a back rest element both independently and rotatably mounted on said vertical support portion of said arm support means, rivet means secured to said arm support means, and table means removably secured by virtue of bayonet slot lock means to said rivet means, said table means, including a table portion provided with an arm rest extension at one side thereof and terminating in a table supporting bracket having said bayonet slot lock means, said table means provided with compactly foldable downwardly divergent leg means on an end portion thereof, said back rest element being adapted to equalizably adjust itself to the torso of a person seated on said seat element.

References Cited in the file of this patent

UNITED STATES PATENTS

| | | |
|---|---|---|
| 244,191 | Corwin | July 12, 1881 |
| 766,320 | Brown | Aug. 2, 1904 |
| 2,560,001 | Scholfield et al. | July 10, 1951 |
| 2,663,764 | Holmes | Dec. 22, 1953 |